United States Patent [19]
Garside

[11] 4,129,432
[45] Dec. 12, 1978

[54] EXPENDABLE REFRIGERATION SYSTEM

[75] Inventor: David Garside, Rosemere, Canada

[73] Assignee: Garwall Cooling Limited, Montreal, Canada

[21] Appl. No.: 793,646

[22] Filed: May 4, 1977

[51] Int. Cl.$^2$ .............................................. F25D 3/10
[52] U.S. Cl. .................................... 62/222; 62/514 R
[58] Field of Search ................ 62/514 R, 50, 222, 78, 62/56

[56] References Cited
U.S. PATENT DOCUMENTS

| | | | |
|---|---|---|---|
| 357,830 | 2/1887 | Holmes | 62/514 R X |
| 2,496,816 | 2/1950 | Schlumbohm | 62/514 X |
| 3,001,374 | 9/1956 | Hutton, Jr. | 62/514 R X |

Primary Examiner—William E. Wayner
Attorney, Agent, or Firm—Larson, Taylor and Hinds

[57] ABSTRACT

An expendable refrigeration system is disclosed for use with an insulated storage compartment. The system utilizes a concept of the liquid coolant storage reservoir being kept at a cold temperature and withdrawing heat from a storage compartment. The pressurized uninsulated liquid carbon dioxide storage reservoir is within the storage compartment and has a vent from a gaseous space in the liquid storage reservoir. A pressure relief valve is installed in the vent adapted to maintain a substantially constant pressure within the liquid storage reservoir, such that the temperature of the liquid carbon dioxide within the storage reservoir is controlled and is below the desired temperature within the insulated storage compartment.

8 Claims, 6 Drawing Figures

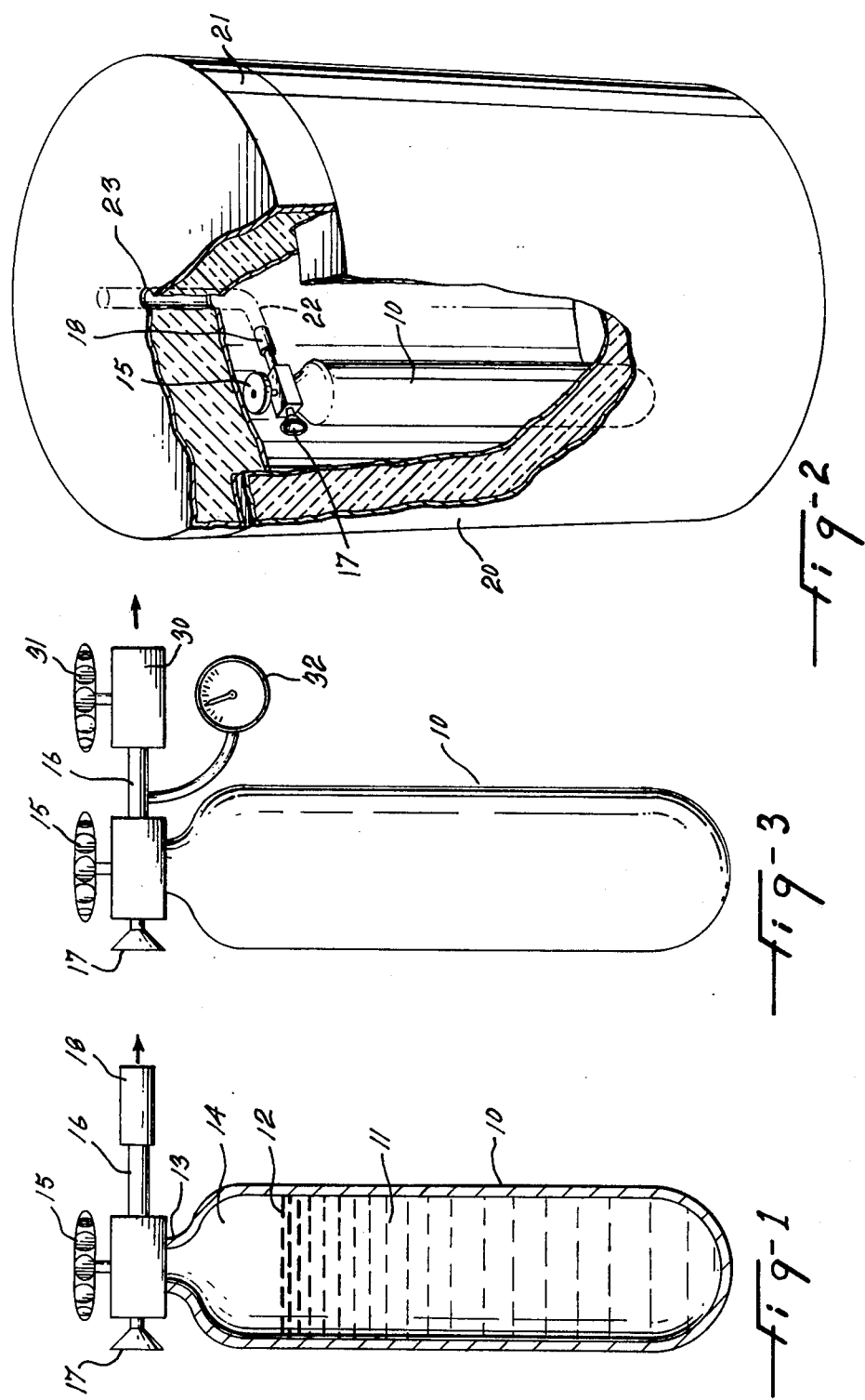

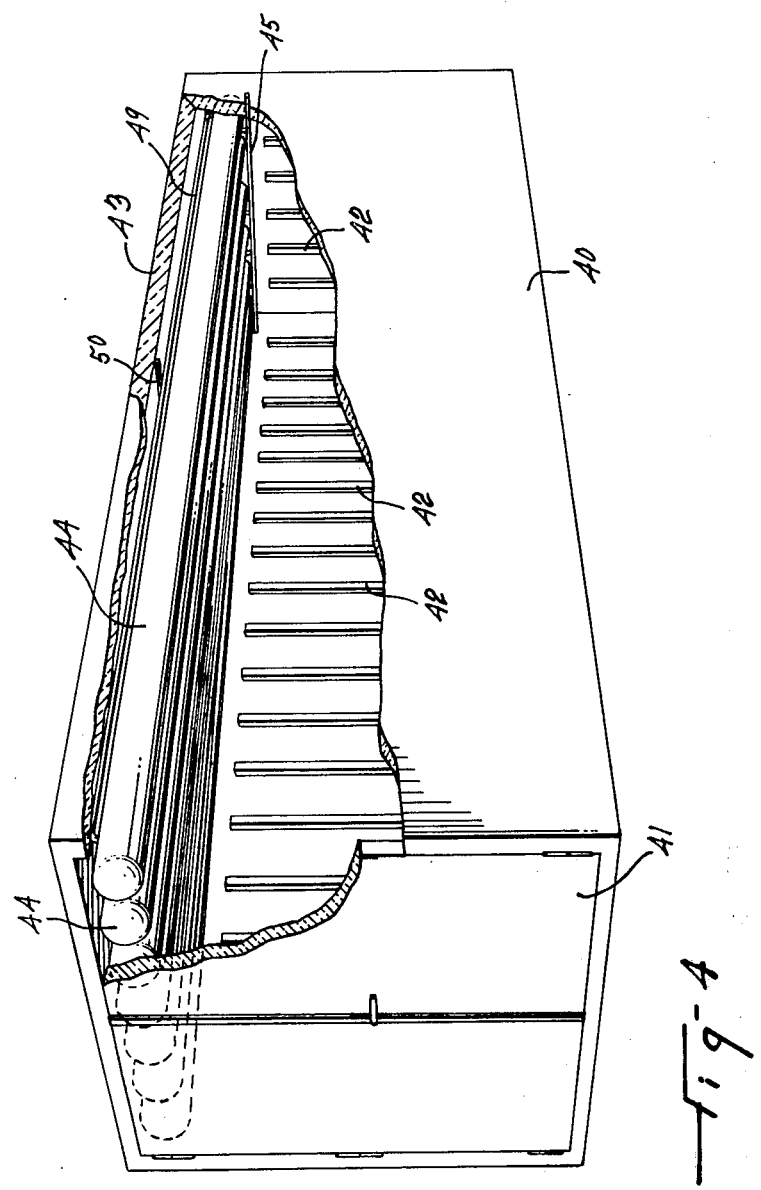

EXPENDABLE REFRIGERATION SYSTEM

The present invention relates to refrigeration systems and more particularly to a self-contained refrigeration chamber incorporating an expendable liquid gas supply.

Liquified gases are generally stored at either very low temperatures at more or less atmospheric pressures, or at more or less ambient temperatures under high pressures. Or in some cases, a compromise is reached where liquified gas is stored under a medium pressure at temperatures below ambient. Liquid carbon dioxide is commonly stored under pressure at temperatures well below ambient, typically at 300 lbs/sq. inch and at 0° F. Liquid carbon dioxide is one expendable gas used for the purpose of refrigeration. It is stored in a pressure vessel usually separate and some times remote from the refrigeration chamber. Presently carbon dioxide refrigeration systems of the expendable type function by spraying gas and solid particles of carbon dioxide into a refrigeration chamber. In such a system there is no specific relationship between the temperature of the stored liquified gas and the temperature required in the refrigeration chamber.

Liquid carbon dioxide is generally stored at pressures of about 300 lbs/sq. inch but may be stored at pressures as high as 800 lbs/sq. inch. At the lower pressure the product is denser and its thermal capacity (BTU/lb.) is higher. In existing systems, liquid carbon dioxide at storage pressure is conducted through control elements and a restriction into the refrigeration chamber. The carbon dioxide cannot exist in a liquid state at more or less atmospheric pressure and flashes instantly into a mixture of solid and gaseous carbon dioxide. Subsequently, the solid carbon dioxide, or snow as it is commonly referred to, sublimates to the gaseous state. The refrigeration chamber and the contents therein are thus refrigerated partly by the cold carbon dioxide gas, but principally as a result of heat absorbed by the sublimating solid particles of carbon dioxide.

The spraying of liquid gases at extreme low temperature into a storage area for refrigeration can cause damage to delicate foods stored therein. Solid particles of carbon dioxide cause intense cooling at the point of contact with the food and may damage the food making it unsuitable for thawing and further use. One of the oldest types of self-contained expendable refrigeration systems is the ice box where ice is intimately associated with the refrigeration chamber. However, ice has a temperature of 32° F. and this results in a temperature in the refrigeration chamber of about 38° to 40° F. This temperature is not suitable for some types of food namely fish and meat which should preferably be kept at 5° to 15° F. There is need for a self-contained refrigeration chamber suitable for use in transport containers and on boats, campers, etc., which does not have any complex mechanical workings, and which keeps a refrigeration chamber at a temperature of at least as low as 0° F. for a number of days.

In the present invention, liquified carbon dioxide is stored, and more or less precisely maintained, at a constant, predetermined pressure and temperature within a refrigeration chamber such that the liquid carbon dioxide storage reservoir forms a heat exchange vehicle which serves to remove heat from the refrigeration chamber. By using such a system, the atmosphere within the refrigeration chamber may become primarily carbon dioxide which offers benefit to some products to be refrigerated. Alternatively, if no carbon dioxide atmosphere is required, the carbon dioxide from the storage reservoir may be vented outside the refrigeration chamber. The carbon dioxide venting from the gas storage reservoir always vents from the gaseous space of the reservoir and thus does not introduce liquid into the refrigeration chamber which would flash to a mixture of gas and solid. Whether the carbon dioxide gas vents inside or outside the refrigeration chamber has little consequence to the refrigeration. Cooling in the chamber occurs primarily by heat passing by convection, conduction and radiation from the walls of the refrigeration chamber and the atmosphere and contents therein, into the cold walls of the carbon dioxide storage reservoir. The heat is absorbed into the liquid carbon dioxide causing the temperature to rise, and as the pressure in the reservoir remains substantially constant due to a pressure relief valve, the liquid boils and gas escapes from the reservoir to vent through the pressure relief valve. In this way the temperature and pressure within the carbon dioxide storage reservoir remains substantially constant.

The present invention provides a refrigeration system of extreme simplicity requiring only a pressure relief valve and a vent with external source of power.

The present invention provides in combination with a refrigeration chamber having an insulated storage compartment, a pressurized uninsulated liquid carbon dioxide storage reservoir within the storage compartment, said liquid storage reservoir having a gaseous space, a vent from the gaseous space, and a pressure relief valve in the vent adapted to maintain a substantially constant pressure within the liquid storage reservoir such that the temperature of the liquid carbon dioxide within the storage reservoir is controlled and is below the desired temperature within the insulated storage compartment.

In drawings which illustrate embodiments of the invention,

FIG. 1 is a cross sectional elevation of an uninsulated pressurized liquid carbon dioxide bottle having a pressure relief valve and a safety valve.

FIG. 2 is an isometric view partly in section of one embodiment of the present invention showing a pressurized liquid carbon dioxide bottle of the type shown in FIG. 1 within an insulated storage compartment.

FIG. 3 is an elevation of an uninsulated pressurized liquid carbon dioxide bottle having an adjustable pressure relief valve.

FIG. 4 is an isometric view of an insulated shipping container having a plurality of pressurized liquid carbon dioxide cylinders attached beneath the roof of the container.

Figure 5:
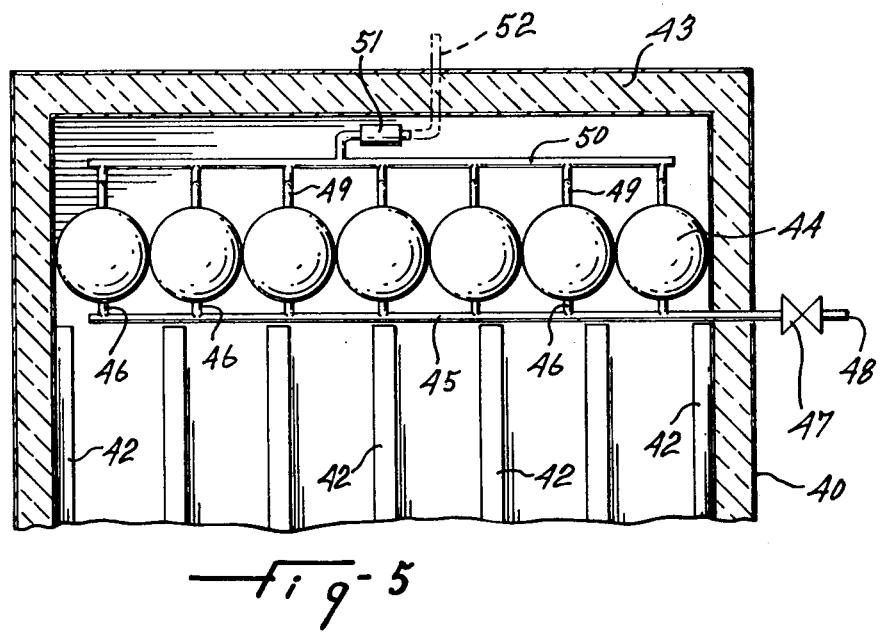
FIG. 5 is a partial cross-sectional end elevation through the shipping container shown in FIG. 4.

Referring now to the drawings, FIGS. 1 and 2 illustrate one embodiment of the invention in a simple form. An uninsulated cylindrical pressure bottle 10 is shown in FIG. 1 filled with liquid carbon dioxide 11 and with the bottle 10 positioned so that the level 12 of liquid carbon dioxide 11 is below the bottle outlet 13. A gaseous space 14 remains above the liquid level 12 and is in communication with the bottle outlet 13. The bottle outlet 13 has a manual shut off valve 15, a filling connection 16 and a safety release valve 17. The safety release valve 17 is set to release at a pressure well within the pressure capabilities of the bottle 10. All these features are a standard connection for any type of gas bottle. After filling with liquid carbon dioxide valve 15 is closed and a pressure relief valve 18 of a characteristic such that it will maintain more or less precisely a pressure not exceeding 300 lbs/sq. inch is fitted to the filling connection 16, the shut off valve 15 is then reopened. Gas from the gaseous space 14 escapes through the pressure relief valve 18 which maintains a substantially constant pressure within the gaseous space 14 and hence the bottle 10. Evaporation or boil off occurs at the liquid level 12 where the liquid carbon dioxide 11 changes to gas. The heat required for this change of state is drawn from the liquid carbon dioxide 11 which in turn draws heat from the surrounding bottle 10.

As may be seen in FIG. 2 the bottle 10 stands and is preferably secured in an insulated storage compartment 20 which has a lid 21 fitted to the top. The lid 21 does not seal the storage compartment 20 inasmuch as there must be provision for escaping gas from the pressure relief valve 18 to vent from the storage compartment 20, otherwise a pressure build up occurs within the compartment 20 which is undesirable. The bottle 10 may be removed for refilling or alternatively if there is a supply of liquid carbon dioxide available, the bottle 10 may be kept within the insulated storage compartment 21 and refilled by a hose connected to the filling connection 16.

In another embodiment a vent pipe 22, shown in chain dotted lines, is connected to the pressure relief valve 18 and passes through an access hole 23 in the lid 21. In this embodiment the atmosphere within the storage compartment 20 is free from the venting carbon dioxide gas.

In the embodiment shown the bottle 10 is a standard pressurized storage reservoir filled with liquid carbon dioxide leaving a gaseous space 14 above the liquid level 12 open to the bottle outlet 13 and hence the pressure relief valve 18. Other types of pressurized liquid carbon dioxide storage reservoirs may be used, it is preferable that the contact between the liquid and the surface of the reservoir be kept at a maximum as the liquid contact surfaces act as heat exchangers and draw heat from the insulated storage compartment. Furthermore, it is essential that the gaseous space above the liquid level in the reservoir always be vented through the pressure relief control valve. If the cylinder should become tipped such that liquid is vented through the control valve the unit becomes inefficient, the liquid carbon dioxide flashes to a mixture of gas and solid carbon dioxide, causing far colder conditions initially within the refrigeration chamber and this could damage delicate foods if they were within the insulated storage compartment. Furthermore, the temperature within the chamber would not remain constant but would fluctuate. Special liquid storage reservoirs may be used of varying shapes having vent lines connecting to the gaseous space above the liquid level.

FIG. 3 shows an embodiment wherein a pressure relief valve 30 is connected to the filling connection 16 and has a manual handle 31 to adjust the pressure within the bottle 10. A pressure gauge 32 is also shown, and if desired the pressure gauge 32 may be calibrated in temperature units rather than pressure units, as there is a direct relationship between pressure and temperature in liquid carbon dioxide storage reservoirs. Thus the temperature within the bottle 10 may be varied by the handle 31. In another embodiment, fins are included on the bottle or liquid storage reservoir to improve the heat exchange properties between the bottle and the atmosphere within the insulated storage compartment. In yet another embodiment a coil extends into the storage compartment from the liquid storage space of the bottle or liquid storage reservoir. The coil always remains full of liquid carbon dioxide which improves the heat exchange properties between the liquid carbon dioxide and the atmosphere within the insulated storage compartment.

In operation, the bottle 10 is filled with liquid carbon dioxide. If the pressure relief valve 18 is set at 300 lbs/sq. inch gauge when equilibrium occurs within the bottle, the liquid temperature becomes 0° F. In some cases, bulk carbon dioxide liquid is stored at considerably higher temperatures and higher pressures. In such a case, the full bottle 10 is placed in the refrigeration chamber, the pressure relief valve is set for a pressure which is known to be equivalent to the desired temperature, and the manual shut off valve 15 is opened. Gas immediately vents from the bottle and as the pressure in the gaseous space 14 drops, evaporation occurs at the liquid level 12 causing more gas to vent through the pressure relief valve 18. The latent heat necessary for the liquid to evaporate is drawn first of all from the liquid dioxide within the bottle, then when the liquid drops to the desired temperature, heat is drawn from the walls of the liquid carbon dioxide bottle 10 which in turn draws heat from the atmosphere within the insulated storage compartment 20. The temperature of the liquid gas within the bottle 10 always remains colder then the atmospheric temperature within the insulated storage compartment 20. However, in cases where excellent insulation occurs in the insulated storage compartment, equilibrium is reached where there is little difference in the temperature of the liquid carbon dioxide in the bottle 10 and the atmosphere within the insulated storage compartment 20. After the first initial evaporation or boil off of liquid carbon dioxide to gas, the liquid carbon dioxide remains at the desired temperature and the pressure is controlled within the bottle by the pressure relief valve 18. Additional evaporation occurs when heat is withdrawn from the liquid reservoir walls which in turn cools the atmosphere within the insulated storage compartment 20. Thereafter liquid carbon dioxide evaporates slowly into gas at a rate dependent on the insulating properties of the insulated storage compartment. Thus, without any mechanically operated components, the temperature within the storage compartment remains just slightly above the temperature of the liquid carbon dioxide within the bottle. If a variable pressure relief valve 30 is used, as shown in FIG. 3, then the handle 31 may be adjusted to vary the pressure and hence the temperature within the bottle. A preferred temperature range is −10° F. to 40° F.

Figure 6:
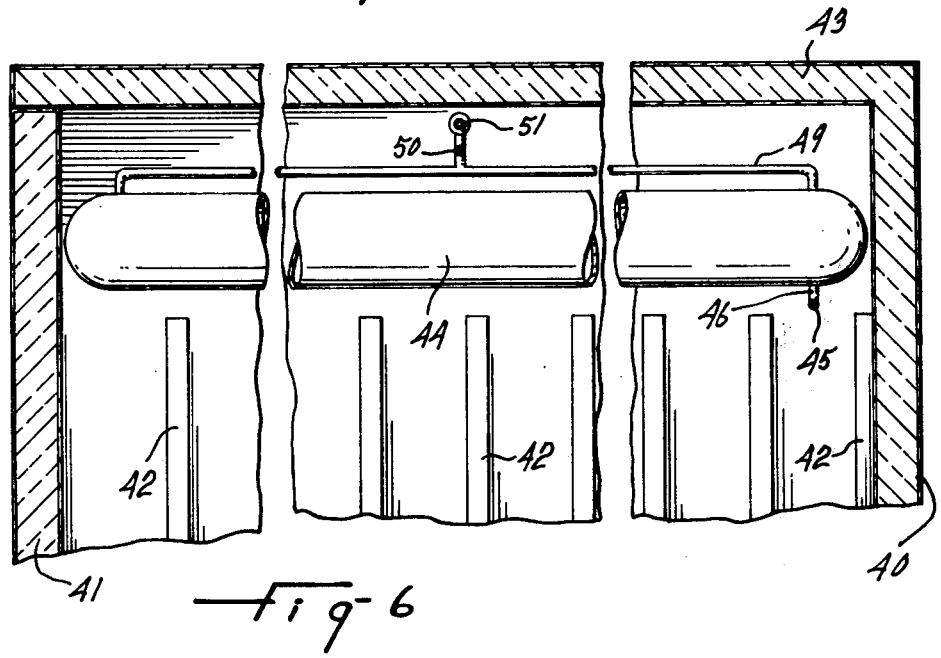
FIG. 6 is a partial cross-sectional side elevation through the shipping container shown in FIG. 4.

Another embodiment of the present invention is disclosed in FIG. 4 wherein an insulated container 40 has twin outward opening doors 41 at one end. The container 40 is made to ISO standards, and has dimensions 20 feet long, 8 feet wide, and 9.5 feet high. The construction of the container is fiberglas/plywood sandwich construction with insulation therebetween. The internal walls and door panels have vertical ribs 42 to hold the cargo away from the wall surfaces thus permitting air to pass between the walls and the cargo walls and circulate for improved cooling. The roof 43 of the container 40 has on its interior surface or ceiling a row of seven cylindrical bottles 44 adjacent and touching each other, and extending substantially for the full length of the container. Thus the ceiling of the container roof 43 is completely covered by the cylindrical bottles 44. The bottles 44 are filled with liquid carbon dioxide and the carbon dioxide liquid touching the walls of the bottles 44 acts as a heat exchanger which draws heat from the interior of the container 40. The manifold system for filling and venting the bottles 44 is shown in FIGS. 5 and 6. A liquid manifold line 45 has connections 46 to a bottom location of each bottle 44. The liquid manifold line 45 extends out through the insulated wall of the container 40 and has a valve 47 and a filling connection 48. Each bottle 44 has a vent pipe 49 which connects to the top of the bottle 44 at each end. This construction of vent pipe 49 permits gas from the gaseous space above the liquid to enter the vent pipe 49 even when the container is moving backwards or forwards, such as on a ship, train, or road vehicle. A vent line manifold 50 joins to each vent pipe 49 and in turn leads to a pressure relief valve 51 located above the manifold 50. As shown in chain dotted a connection 52 may be connected to the pressure relief valve 51 to vent the carbon dioxide gas outside the container rather than inside. Thus, the container 40 is suitable for shipping vegetables or fruit which require an air atmosphere or other types of food products which require a carbon dioxide atmosphere. Furthermore, the temperature of the liquid carbon dioxide within the bottles 44 is kept within the range of $-10°$ F. to $40°$ F. thus the temperature within the storage area of the container 40 is only slightly above the liquid carbon dioxide temperature, and is selected so that it is suitable for the shipping of the particular food stored therein.

The embodiment shown in FIGS. 4, 5 and 6 is but one of many embodiments incorporating liquid carbon dioxide storage reservoirs contained within an insulated shipping container. In one embodiment short liquid storage reservoirs are used rather than long ones to prevent the liquid carbon dioxide slopping backwards and forwards within the reservoirs. Such liquid reservoirs are more suited for transportation by sea. Other changes may be made to the shape of the liquid gas storage reservoirs and to the shape of the insulated storage compartment without departing from the scope of the present invention.

EXAMPLE

An insulated storage chamber was prepared having a cylindrical configuration with an outside diameter of 21 inches and an inside diameter of 15 inches. The exterior height was 36 inches and the interior height was 28 inches and this gave an exterior surface area of 21.30 sq. feet and an internal surface area of 11.62 sq. feet. Construction of the inner and outer walls of the chamber was 16 gauge aluminum sheet, and the insulation between the walls was 2 lb. density expanded polyurethane foam having a nominal 1 inch K valve of 0.15 BTU/sq.ft/° F./hour. Thus the storage chamber was calculated to have a heat gain of 0.823 BTU/° F./hour. If, therefore, it was desired to maintain the temperature within the chamber of $0°$ F., in an ambient temperature of $65°$ F., the hourly heat gain is calculated to be 53.5 BTU's and to obtain this heat gain 0.448 lbs. of liquid carbon dioxide would have to boil off without increasing the pressure above 305 lbs/sq. in. Thus it was calculated daily consumption of liquid carbon dioxide would be 10.75 lbs.

An aluminum pressure cylinder, uninsulated, having an internal volume of 2.86 cu. ft. was charged with 20 lbs. of liquid carbon dioxide believed to be at $0°$ F. and at a pressure of 305 lbs/sq. inch. The pressure relief valve on the cylinder was for 300 lbs/sq. inch. The cylinder was placed into the storage chamber and the manual valve opened. Excess pressure which built up in the cylinder between the filling step and opening the valve resulted in a rapid venting of gas through the relief valve for a short time, but then the condition stabilized and the pressure in the cylinder remained at 300 lbs/sq. inch at a temperature of $0°$ F.

One hour after opening the valve the temperature within the chamber had dropped to $2°$ F. Water in an open beaker was placed in the chamber, and froze solid in a few hours. The experiment was continued for 21½ hours, and then terminated. The temperature inside the chamber remained steady at $1°$ F. after the first 2 hours. There was 8.5 lbs. of liquid carbon dioxide remaining in the cylinder at the end of the experiment which showed a liquid consumption of 11.5 lbs. for 21½ hours. This result confirms the calculated consumption within experimental limits taking into account the freezing of the water, opening the lid of the chamber from time to time and inaccuracies in the construction of the chamber.

The embodiments of the invention in which an exclusive property or privilege is claimed are defined as follows:

1. In combination with a refrigeration chamber having an insulated storage compartment,
    a pressurized uninsulated liquid carbon dioxide storage reservoir within the storage compartment, said liquid storage reservoir having a gaseous space,
    a vent from the gaseous space,
    and a pressure relief valve in the vent adapted to maintain a substantially constant pressure within the liquid storage reservoir, such that the temperature of the liquid carbon dioxide within the storage reservoir is controlled and is below the desired temperature within the insulated storage compartment.

2. The combination of claim 1 wherein the temperature of the liquid carbon dioxide is in the range of $-10°$ F. to $40°$ F.

3. The combination of claim 1 wherein the vent exits in the storage compartment.

4. The combination of claim 1 wherein the vent exits outside the storage compartment.

5. The combination of claim 1 wherein the liquid storage reservoir is removable from the storage compartment.

6. The combination of claim 1 wherein the pressure relief valve has a variable adjustment means to vary the pressure and hence the temperature within the storage reservoir.

7. The combination of claim 1 wherein the storage compartment is an insulated shipping container having four walls at least one of which has at least one door therein, a floor and a roof, and wherein the liquid storage reservoir comprises a plurality of cylinders attached beneath the roof of the container, the plurality of cylinders having a gas manifold vent from the gaseous space in each of the plurality of cylinders and a liquid manifold connection adapted to retain a common liquid level within the plurality of cylinders.

8. The combination of claim 1 wherein the liquid storage reservoir is cylindrical in shape and has a filling connection, a manual shut off valve and a safety relief valve.

* * * * *